(12) United States Patent
Fan et al.

(10) Patent No.: US 11,693,253 B2
(45) Date of Patent: Jul. 4, 2023

(54) METHOD FOR DESIGNING DIFFRACTION SUPPRESSION OPTICAL COMPONENT, DISPLAY SCREEN AND UNDER-SCREEN CAMERA APPARATUS

(71) Applicant: JIAXING UPHOTON OPTOELECTRONICS TECHNOLOGY CO, LTD., Tongxiang (CN)

(72) Inventors: Zhentao Fan, Tongxiang (CN); Hui Feng, Tongxiang (CN); Kai Zhang, Tongxiang (CN); Chenhao Dou, Tongxiang (CN); Hao Wu, Tongxiang (CN); Kehan Tian, Tongxiang (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 17/802,734

(22) PCT Filed: Feb. 23, 2021

(86) PCT No.: PCT/CN2021/077458
§ 371 (c)(1),
(2) Date: Aug. 26, 2022

(87) PCT Pub. No.: WO2021/169950
PCT Pub. Date: Sep. 2, 2021

(65) Prior Publication Data
US 2023/0142069 A1   May 11, 2023

(30) Foreign Application Priority Data
Feb. 27, 2020 (CN) .......... 202010124247.X

(51) Int. Cl.
G02B 27/42 (2006.01)
H04M 1/02 (2006.01)
G02B 27/00 (2006.01)

(52) U.S. Cl.
CPC ..... G02B 27/4205 (2013.01); G02B 27/0012 (2013.01); H04M 1/0264 (2013.01); H04M 1/0266 (2013.01)

(58) Field of Classification Search
CPC .......... G02B 27/4205; G02B 27/0012; H04M 1/0264; H04M 1/0266
(Continued)

(56) References Cited

U.S. PATENT DOCUMENTS

2021/0200063 A1* 7/2021 Jun .................. G03B 29/00

FOREIGN PATENT DOCUMENTS

CN      101261334     9/2008
CN      101261334 A   9/2008
(Continued)

*Primary Examiner* — Collin X Beatty
(74) *Attorney, Agent, or Firm* — Hauptman Ham, LLP

(57) ABSTRACT

A method for designing a phase-typed diffraction suppressing optical device (12) for a transparent display screen(11) is disclosed, which comprises: acquiring a light field complex amplitude distribution $U(x_2,y_2,d)=A(x_2,y_2,d)\exp(i\varphi_{20}(x_2,y_2,d))$ on a plane with a distance d from the transparent display screen (12) after a plane wave is transmitted through the screen; and designing the diffraction suppressing optical device (12), so that it has a transmittance function $t_2(x_2,y_2)=\exp(i\varphi_{21}(x_2,y_2))$ and satisfies $\varphi_{20}(x_2,y_2,d)+\varphi_{21}(x_2,y_2)=C$, where C is a constant. A diffraction suppressing optical device (12) and an under-screen camera apparatus (1) comprising the same are disclosed. The phase-typed diffraction suppressing optical device (12) suppresses the (Continued)

diffraction effect in the under-screen camera apparatus (1) by providing phase modulation, thereby improving the quality of under-screen imaging.

9 Claims, 10 Drawing Sheets

(58) Field of Classification Search
USPC .......................................................... 359/567
See application file for complete search history.

(56) References Cited

FOREIGN PATENT DOCUMENTS

| | | |
|---|---|---|
| CN | 109274789 | 1/2019 |
| CN | 109274789 A | 1/2019 |
| CN | 111402712 | 7/2020 |

* cited by examiner

METHOD FOR DESIGNING DIFFRACTION SUPPRESSION OPTICAL COMPONENT, DISPLAY SCREEN AND UNDER-SCREEN CAMERA APPARATUS

The present application is a U.S. National Phase of International Application No. PCT/CN2021/077458, filed Feb. 23, 2021, which claims the priority of Chinese Patent Application No. 202010124247.X, filed Feb. 27, 2020.

BACKGROUND

The application generally relates to under-screen imaging technology, and particularly to a method for designing a diffraction suppressing optical device, a diffraction suppressing display screen, and an under-screen imaging apparatus that can be used to improve the quality of under-screen imaging.

Taking photos and displaying has become an essential function of smartphones, and a front camera of smartphones is even more important. Because the front camera can not only meet the needs of the selfie but also have greater use in face recognition and content interaction. Therefore, the front camera has become indispensable in mobile phones.

Meanwhile, with the improvement of the functionality of smartphones, large-screen mobile phones are more in line with the market trend. Since the screen cannot be expanded indefinitely, the demand for mobile phones with a high screen ratio is also relatively strong, and full screen is born. However, due to the front camera, a full screen in the true sense has not been well realized.

In order to solve the problem that the front camera affects the realization of the full screen, the existing technology proposes to place the front camera under the screen to completely hide the front camera, so as to realize the full screen. However, the existence of the display screen has a great impact on the shooting effect of the under-screen camera. In particular, the periodically arranged unit pixels under strong light illumination will form a starburst effect due to the diffraction effect, thereby affecting the quality of imaging.

Therefore, new under-screen camera technology is provided to suppress the starburst effect caused by diffraction, thereby improving the imaging quality of the under-screen camera.

SUMMARY

The present disclosure provides a diffraction suppressing optical device, a diffraction suppressing display screen, and an under-screen imaging apparatus, which can be used to suppress diffraction in the under-screen camera apparatus, thereby improving the imaging quality.

According to one aspect of the present disclosure, a method for designing diffraction suppressing optical device for a transparent display screen is provided, comprising the following steps:

(a) acquiring a transmittance function $t_1(x_1, y_1)$ of the transparent display screen;

(b) based on the transmittance function $t_1(x_1, y_1)$, calculating a light field complex amplitude distribution $U(x_2, y_2, d) = A(x_2, y_2, d)\exp(i\varphi_{20}(x_2, y_2, d))$ on a plane with a distance d from the transparent display screen after a plane wave $U_0 = A_0 \exp(i\varphi_0)$ is incident on the transparent display screen and transmitted; and (c) designing the diffraction suppressing optical device, so that it has a transmittance function $t_2(x_2, y_2) = \exp(i\varphi_{21}(x_2, y_2))$ and satisfies $\varphi_{20}(x_2, y_2, d) + \varphi_{21}(x_2, y_2) = C$, where C is a constant.

In some advantageous embodiments, the method may further comprise:

(d) changing value of the distance d, and repeating the steps (b) and (c) above; and (e) corresponding to different values of the distance d, and based on the transmittance function $t1(x1,y1)$ of the transparent display screen and the transmittance function $t2(x2,y2)$ of the diffraction suppressing optical device, simulating diffraction suppressing effect or modulation transfer function of an optical system comprising the transparent display screen and the diffraction suppressing optical device; and selecting value of the distance d and a corresponding transmittance function $t2(x2,y2)$ of the diffraction suppressing optical device by comparing the diffraction suppressing effect or the modulation transfer function.

Preferably, the value of the distance d is changed within a range of 0.1 mm to 5 mm, and more preferably, the value of the distance d is changed within a range of 0.3 mm to 2 mm.

In some embodiments, the diffraction suppressing optical device may be a diffractive optical element, the diffractive optical element comprises a substrate layer and a relief layer, and the method further comprises: determining a structure of the relief layer of the diffractive optical element according to the transmittance function $t2(x2,y2)$ and/or refractive index of material and thickness of the substrate layer of the diffractive optical element according to the distance d.

In some embodiments, the step (a) may comprise: calculating the transmittance function $t1(x1,y1)$ based on optical parameters and geometric parameters of a layered structure of the transparent display screen.

According to another aspect of the present disclosure, a diffraction suppressing display screen is provided, comprising: a display screen that allows light to pass therethrough and comprises periodically arranged pixel units; and a first diffraction suppressing optical device disposed at a distance d from the display screen, the display screen has a first transmittance function $t1(x1,y1)$, so that a light field complex amplitude distribution $U(x2,y2,d)=A(x2,y2,d)\exp(i\varphi20(x2,y2,d))$ is obtained when a plane wave $U0=A0\exp(i\varphi0)$ is incident on the display screen and transmitted and then propagated by the distance d, and the first diffraction suppressing optical device has a second transmittance function $t2(x2,y2)=\exp(i\varphi21(x2,y2))$, and satisfies $\varphi20(x2,y2,d)+\varphi21(x2,y2)=C$, where C is a constant.

The distance d is preferably in the range of 0.1 mm to 5 mm, and more preferably in the range of 0.3 mm to 2 mm.

The display screen may further comprise light-shielding strips periodically arranged around the pixel units, and the diffraction suppressing display screen may further comprise a second diffraction suppressing optical device, which is configured to have a third transmittance function $t3(x3,y3)=A3(x3,y3)$, so as to change light transmittance at a position near an edge of the light-shielding strips. The second diffraction suppressing optical device may be incorporated within the display screen or disposed between the display screen and the first diffraction suppressing optical device.

In some embodiments, the second diffraction suppressing optical device comprises a sheet-shaped body, the sheet-shaped body comprising: a first region arranged periodically; a second region substantively in a strip shape arranged around the first region; and a transition region, which is located to an edge of the second region. The transition region extends from the edge of the second region along an extension direction which is normal to the edge toward the first region, the first region is a light-transmitting region, and the second region comprises a light-shielding area at least at the edge thereof, and the transmittance of the transition region varies along its extension direction. The light-shielding area at the edge of the second region and the first region of the second diffraction suppressing optical device are aligned in correspondence with an edge of light-shielding strip which is adjacent to a pixel unit of the display screen and the corresponding pixel units, respectively.

Preferably, the transmittance of the transition region of the second diffraction suppressing optical device has a change along its extension direction, which conforms to an apodization function, and the apodization function is selected from a group consisted of linear function, Blackman function, Connes function, and Gaussian function.

In some embodiments, the transition region of the second diffraction suppressing optical device comprises an opaque portion and a transparent portion, and the transmittance of the transition region is determined by a ratio between the opaque portion and the transparent portion.

In some embodiments, the second diffraction suppressing optical device is formed as a sheet-shaped component comprising a first region arranged periodically in two dimensions and a second region having a strip shape and arranged around the first region. The first region is a light-transmitting region, wherein the second region has a shape generated by randomly dislocating a plurality of unit patterns arranged along an extending direction of the strip shape in a lateral direction perpendicular to the extending direction, and the second region is light-shielding at least in its two lateral edge portions.

According to another aspect of the present disclosure, there is provided an under-screen camera apparatus, comprising: the diffraction suppressing display screen as described above, which has a display surface for display and a rear surface opposite to the display surface; and a camera, which is arranged on the back side of the diffraction display screen, and is used for imaging an object located on the display surface side of the diffraction display screen.

According to the present disclosure, the phase-typed diffraction suppressing optical device suppresses the diffraction effect in the under-screen device by providing phase modulation, and improves the imaging quality of under-screen imaging.

BRIEF DESCRIPTION OF THE DRAWINGS

Other features, objects, and advantages of the invention will become more apparent by reading the following detailed description of non-limitative embodiments with reference to the following drawings.

DETAILED DESCRIPTION

Figure 1:
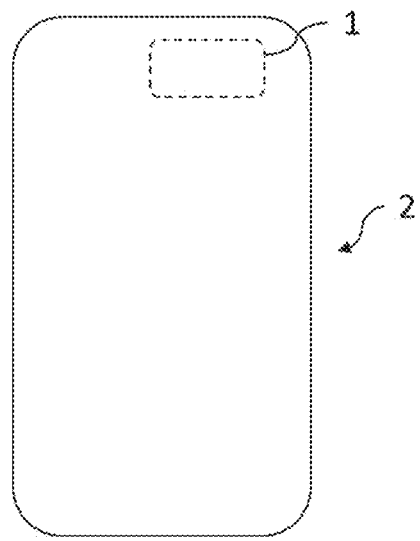
FIG. 1 schematically shows an example of an electronic device incorporating an under-screen camera apparatus according to an embodiment of the invention.

The invention will be further described in detail in conjunction with drawings and embodiments. It should be understood that the specific embodiments described herein are only used to explain the related invention, but not to limit the invention. In addition, it should be noted that, for the convenience of description, only the parts related to the invention are shown in the drawings.

It should be noted that the embodiments in the present application and the features of the embodiments may be combined with each other without conflict. The invention will be described in detail below with reference to drawings and embodiments.

FIG. 1 schematically shows an example of an electronic device incorporating an under-screen camera apparatus according to an embodiment of the invention, a smartphone 2. As illustrated by the example, the smartphone 2 may have a full screen, and the under-screen camera apparatus 1 may be constructed under at least a part of the full screen.

Figure 2:
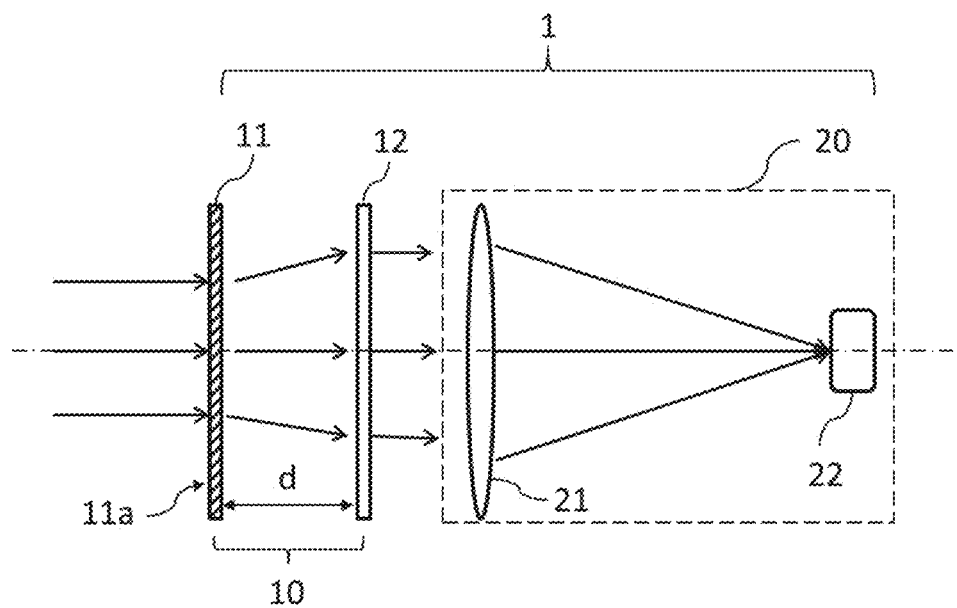
FIG. 2 is a schematic diagram of the under-screen camera apparatus according to the first embodiment of the invention.

FIG. 2 is a schematic diagram of the under-screen camera apparatus according to the first embodiment of the invention. As shown in FIG. 2, the under-screen camera apparatus 1 comprises a diffraction suppressing display screen 10 according to an embodiment of the invention and a camera 20. The diffraction suppressing display screen 10 comprises a transparent display screen 11 and a diffraction suppressing optical device 12. The transparent display screen 11 allows light to pass therethrough and has a display surface 11a for display. The diffraction suppressing optical device 12 is provided on one side of the display screen 11, preferably on the back side of the display screen 11 opposite to the display surface 11a as shown in FIG. 2. According to the embodiment of the invention, the diffraction suppressing optical device 12 is an optical device that suppresses diffraction by phase-modulating the incident light, which has little influence on the amplitude of the incident light and is hereinafter referred to as phase-typed diffraction suppressing optical device. The display surface 11a also constitutes the display surface of the diffraction suppressing display screen 10 at the same time. The camera 20 is provided on the side of the diffraction suppressing display screen 10 opposite to the display surface 11a and is used to receive and image the light transmitted through the display screen 11 and the diffraction suppressing optical device 12. As shown in FIG. 2, the camera 20 comprises, for example, an imaging lens 21 and an image sensor 22.

Due to the internal structure of the display screen 11, especially the periodically arranged pixel units, the light passing through the display screen 11 will have a diffraction effect, so the imaging quality of the camera 20 will be affected, especially the starburst effect will be generated. The Modulation Transfer Function (MTF) of the system will also decrease. Therefore, according to the embodiment of the invention, a phase-typed diffraction suppressing optical device 12 is provided, which is disposed at a distance d from the display screen 11. It is assumed that if the display screen 11 has a first transmittance function $t_1(x_1,y_1)$, so that a light field complex amplitude distribution $U(x_2,y_2,d)=A(x_2,y_2,c)\exp(i\varphi_{20}(x_2,y_2,d))$ is obtained when a plane wave $U_0=A_0\exp(i\varphi_0)$ is incident on the display screen 11 and transmitted and then propagated by the distance d, then a second transmittance function of the diffraction suppressing optical device 12 $t_2(x_2,y_2)=\exp(i\varphi_{21}(x_2,y_2))$ satisfies $\varphi_{20}(x_2,y_2,d)+\varphi_{21}(x_2,y_2)=C$, where C is a constant.

The distance d is preferably set within a range of 0.1 mm to 5 mm. In some examples, it is more preferably set within a range of 0.3 mm to 2 mm.

In some preferred embodiments, the diffraction suppressing optical device 12 is a diffractive optical element (DOE).

Figure 3:
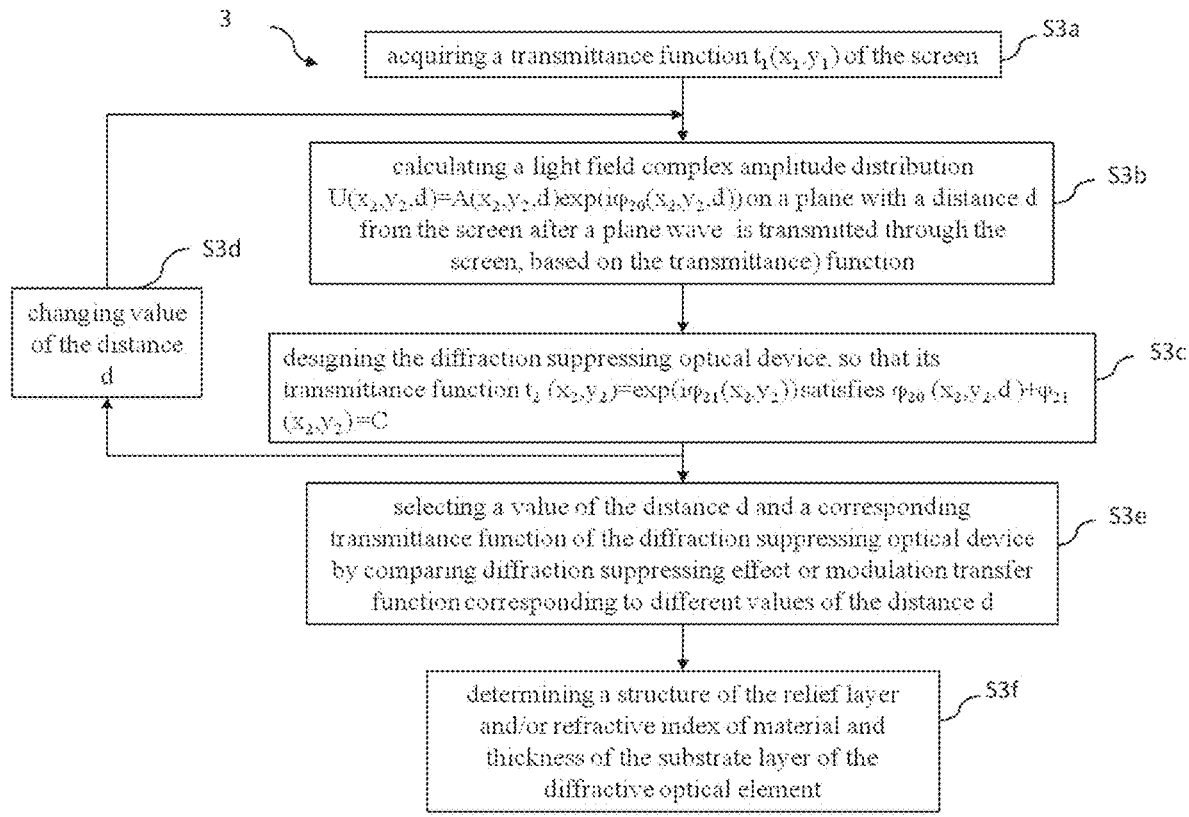
FIG. 3 is a schematic flowchart of an example of a method for designing diffraction suppressing optical device according to an embodiment of the invention.

FIG. 3 is a schematic flowchart of an example of a method for designing a diffraction suppressing optical device 12 according to an embodiment of the invention. As shown in FIG. 3, a method 3 for designing a diffraction suppressing optical device 12 comprises:

S3a: acquiring a transmittance function $t_1(x_1,y_1)$ of the transparent display screen 11;

S3b: based on the transmittance function $t_1(x_1,y_1)$ of the transparent display screen 11, calculating a light field complex amplitude distribution $U(x_2,y_2,d)=A(x_2,y_2,d)\exp(i\varphi_{20}(x_2,y_2,d))$ obtained on a plane with a distance d from the transparent display screen after a plane wave $U_0=A_0\exp(i\varphi_0)$ passes through the transparent display screen;

S3c: designing the diffraction suppressing optical device 12, so that it has a transmittance function $t_2(x_2,y_2)=\exp(i\varphi_{21}(x_2,y_2))$ and satisfies $\varphi_{20}(x_2,y_2,d)+(\varphi_{21}(x_2,y_2)=C$, where C is a constant.

According to different embodiments of the invention, in step S3a, the transmittance function $t_1(x_1,y_1)$ of the transparent display screen 11 may be measured by illuminating the display screen 11 with a known light field and measuring the light field transmitted through the display screen 11 or may be calculated based on optical parameters and geometric parameters of a layered structure of the transparent display screen.

In step S3b, the light field complex amplitude distribution $U(x_2,y_2,d)$ can be calculated based on normal incidence of a plane wave $U_0=A_0\exp(i\varphi_0)$ to the display screen 11; and the calculation can also be based on, for example, non-normal incidence of a plane wave or based on light fields with different incident angles.

In step S3c, since the diffraction-suppressing optical component 12 according to the embodiment of the invention is a phase-typed diffraction suppressing optical device as described above, it is assumed that it has a transmittance function $t_2(x_2,y_2)=\exp(i\varphi_{21}(x_2,y_2))$ (no effect on the amplitude of light), and the transmittance function is designed to satisfy $\varphi_{20}(x_2,y_2,d)+\varphi_{21}(x_2,y_2)=C$, C is a constant. For example, C=0. This means that the wavefront obtained after the plane wave $U_0=A_0\exp(i\varphi_0)$ passing through the transparent display screen 11 and the diffraction suppressing optical device 12 remains flat, and the diffraction effect brought by the display screen 11 is suppressed.

As shown in FIG. 3, the method 3 for designing a diffraction suppressing optical device according to an embodiment of the invention may further comprise:

S3d: changing value of the distance d, and repeating the steps S3b and S3c above; and S3e: corresponding to different values of the distance d, and based on the transmittance function $t_1(x_1,y_1)$ of the transparent display screen and the transmittance function $t_2(x_2,y_2)$ of the diffraction suppressing optical device, simulating diffraction suppressing effect or modulation transfer function of an optical system comprising the transparent display screen and the diffraction suppressing optical device; and selecting a value of the distance d and a corresponding transmittance function $t_2(x_2,y_2)$ of the diffraction suppressing optical device by comparing the diffraction suppressing effect or the modulation transfer function.

In some embodiments, it is preferable to adjust the value of the distance d within certain range, repeat step S3b and step S3c, and calculate and compare the diffraction suppressing effect or the modulation transfer function provided by the optical system comprising the display screen 11 and the diffraction suppressing optical device 12 under different values of the distance d, so as to select a transmittance function $t_2(x_2,y_2)$ of the diffraction suppressing optical device 12, which is corresponding to a relatively better diffraction suppressing effect or modulation transfer function.

It is preferable to change the value of the distance d within the range of 0.1-5 mm, and it is more preferable to change the value of the distance d within the range of 0.3-2 mm. The design of the diffraction suppressing optical device can be based on vector diffraction theory or scalar diffraction theory. However, due to the complex derivation process of vector diffraction theory and the huge amount of calculation, it is generally preferred to use scalar diffraction theory for approximate calculation. However, the inventor found through simulation that when the distance d is too small, that is when it is less than 0.1 mm, the approximate calculation using scalar diffraction theory will seriously deviate from the actual situation, resulting in that the phase-typed diffraction suppressing optical device calculated and designed according to the scalar diffraction theory cannot achieve the expected technical effect. In addition, as the under-screen camera apparatus involved in the invention is mainly used in portable communication devices, such as smartphones, tablet computers, etc., which devices are usually thin, the distance d should not be too large.

According to preferred embodiments of the invention, the diffraction suppressing optical device 12 is a diffractive optical element and comprises a substrate layer and a relief layer. In these embodiments, as further shown in FIG. 3, the method 3 for designing a diffraction suppressing optical device may further comprise:

S3f: determining a structure of the relief layer of the diffractive optical element according to the transmittance function t2 (x2,y2), and/or determining refractive index of material and thickness of the substrate layer of the diffractive optical element according to the distance d.

The diffraction suppressing effect and modulation transfer function of the optical system comprising the display screen 11 and the diffraction suppressing optical device 12 are relatively sensitive to the distance d between the display screen 11 and the diffraction suppressing optical device 12, and it is not easy to strictly control the distance d between the display screen 11 and the diffraction suppressing optical device 12. As if an optical path equivalent to the distance d (in the air) is realized by designing, for example, a substrate layer of the diffraction suppressing optical device 12, a structure in which the display screen 11 and the diffraction suppressing optical device 12 are abutting to each other can be obtained. This is advantageous for simplifying the structure and manufacture of the diffraction suppressing display screen according to the embodiments of the invention.

It should be understood that the above optical path equivalent to the distance d can also be realized by adjusting the relevant layer in the display screen 11, for example, by designing the thickness of the substrate on the side of the display screen 11 opposite to the display surface 11a.

Two examples of the diffraction suppressing optical device 12 will be described below with reference to FIG. 4-FIG. 11.

Figure 4:
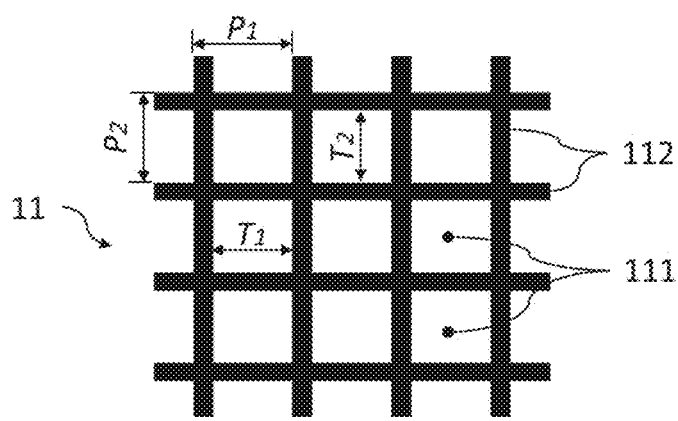
FIG. 4 schematically shows an example of a periodic structure of pixels in a transparent display screen.

FIG. 4 schematically shows an example of a periodic structure of pixels in a transparent display screen. As shown in FIG. 4, the display screen 11 comprises: pixel units 111 arranged periodically and light-shielding strips 112 arranged around the pixel units 111. The light-shielding strips 112 may comprise, for example, a plurality of light-shielding strips along two different directions that are crossed (preferably perpendicular) to each other. The light shielding strips 112 are formed of for example metal gate lines, such as data lines or address lines.

For the purpose of example only and not limitation, in the display screen 11 shown in FIG. 4, the arrangement period of the pixel units in the two directions perpendicular to each other is $P_1=P_2=100$ μm and the width of light-transmitting area of the pixel units in these two directions is $T_1=T_2=80$ μm, that is, the width of the light-shielding strips is 20 μm.

The examples of the diffraction suppressing optical devices described below are all designed for the display screen 11 shown in FIG. 4, and the simulation calculation given is based on the fact that the camera 20 in the under-screen camera apparatus is an ideal lens with a focal length of 3.85 mm, an aperture ϕ=1.925 mm, a wavelength of 532 nm, and other same parameter conditions.

Figure 5:
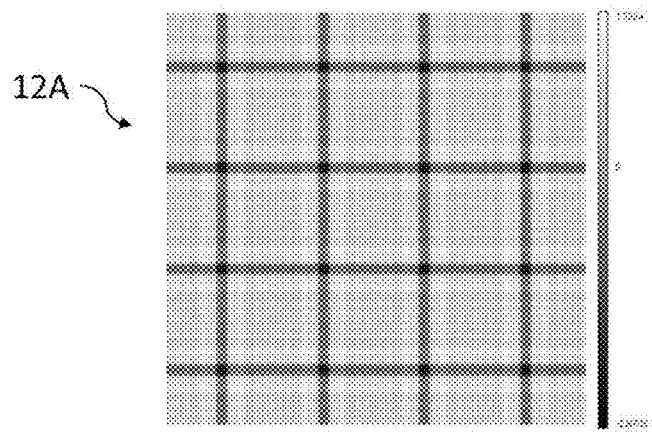
FIG. 5 schematically shows a phase modulation distribution diagram of an example of a phase-typed diffraction suppressing optical device according to an embodiment of the invention.

FIG. 5 shows a diffraction suppressing optical device 12A as an example of the diffraction suppressing optical device 12, which is designed for the display screen 11 shown in FIG. 4 under the condition of the distance d=0.5 mm according to an embodiment of the invention. Specifically, FIG. 5 shows a phase modulation distribution diagram of the diffraction suppressing optical device 12A, which essentially corresponds to the transmittance function $t_2(x_2,y_2)$ of the diffraction suppressing optical device 12A. The grayscale at each position $(x_2,y_2)$ in the phase modulation distribution diagram shown in FIG. 5 represents the magnitude of the phase modulation at that position $\varphi_{21}(x_2,y_2)$ (expressed in radians). For the corresponding relationship between grayscale and radian value, see the scale on the right of FIG. 5. The transmittance function $t_2(x_2,y_2)=\exp(i\varphi_{21}(x_2,y_2))$ of the diffraction suppressing optical device 12A shown in FIG. 5 is calculated according to the method 3 of the embodiment of the invention.

Figure 6:
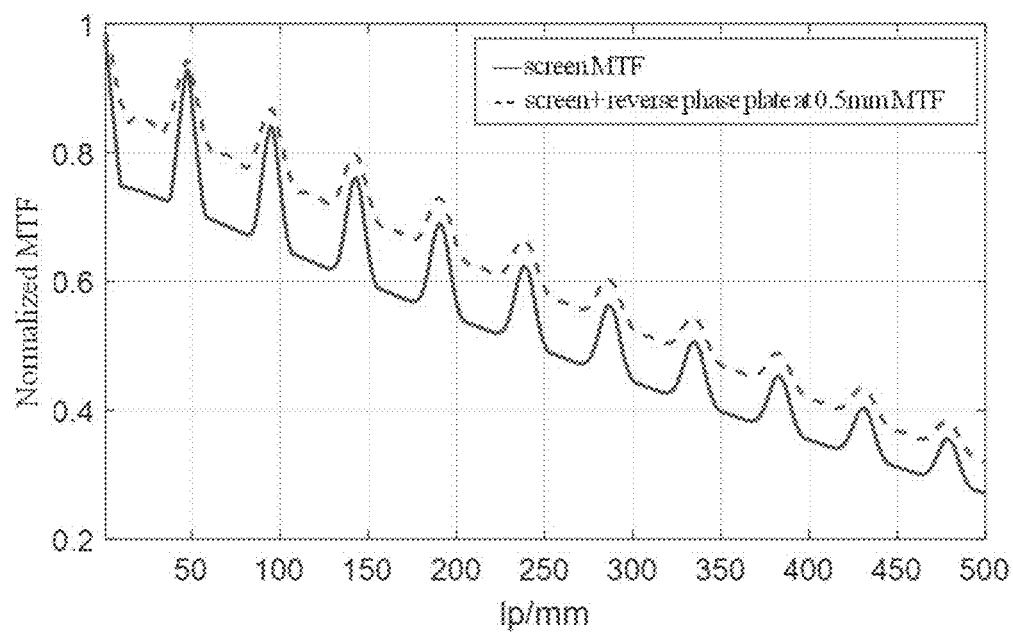
FIG. 6 shows a MTF curve obtained by combining the phase-typed diffraction suppressing optical device shown in FIG. 5 with the transparent display screen.

FIG. 6 shows a MTF curve obtained by combining the diffraction suppressing optical device 12A (referred to as "reverse phase plate" in the figure) shown in FIG. 5 with the transparent display screen 11(referred to as "screen" in the figure) shown in FIG. 4. In fact, a MTF curve of the imaging system with only the display screen 11 is also given in FIG. 6 for comparison. As shown in FIG. 6, the MTF of the system is improved by adding the diffraction suppressing optical device 12A at a distance d=0.5 mm.

Figure 7:
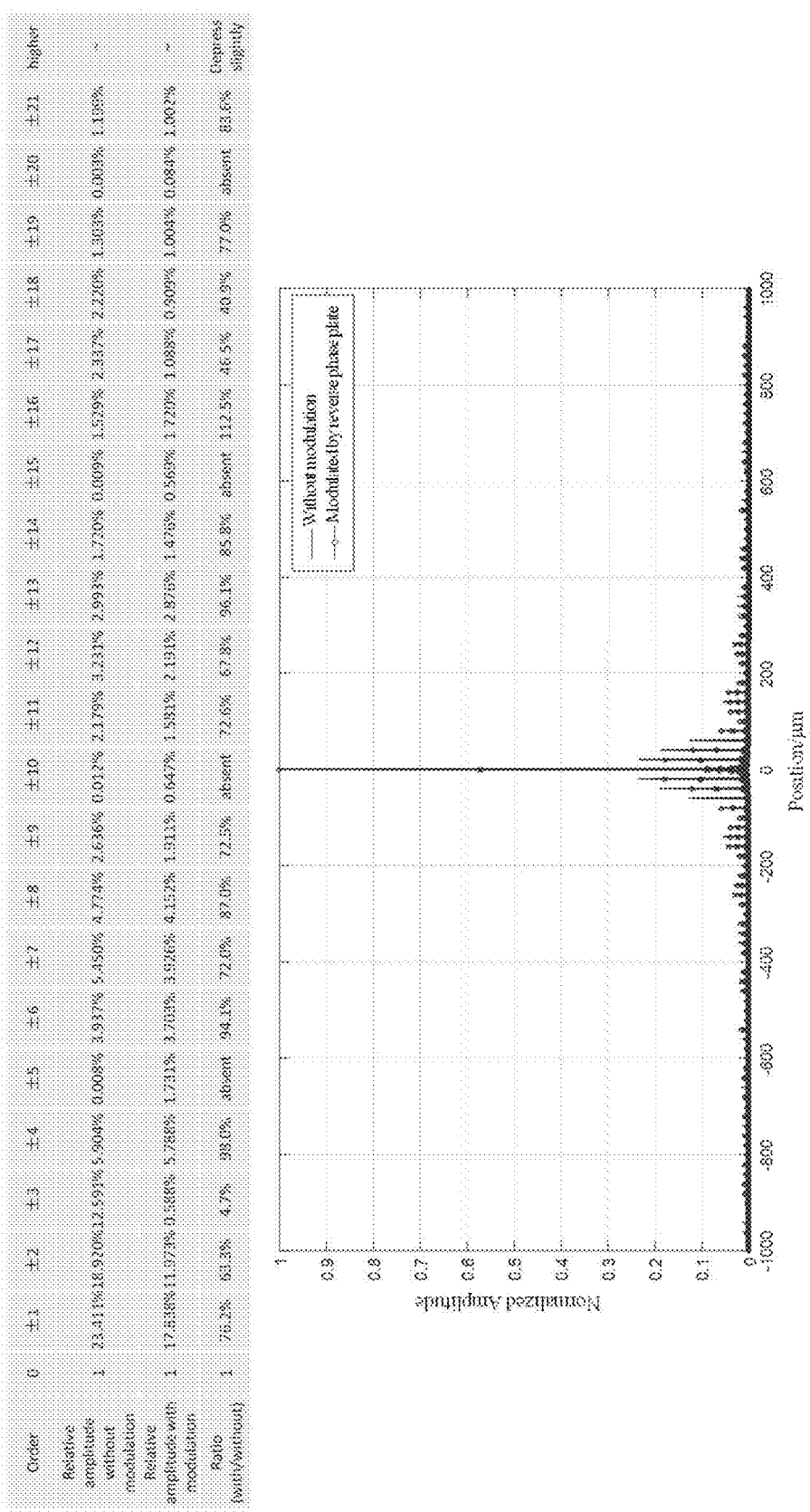
FIG. 7 shows a simulation data chart of the diffraction suppressing effect obtained by combining the phase-typed diffraction suppressing optical device shown in FIG. 5 with the transparent display screen.

FIG. 7 shows a simulation data chart of the diffraction suppression effect of the system obtained by combining the diffraction suppressing optical device 12A shown in FIG. 5 with the transparent display screen 11 shown in FIG. 4. As shown in FIG. 7, the arrangement of the diffraction suppressing optical device 12A has an obvious suppressing effect on the orders of ±1 to ±3 and has a small suppressing effect on most orders equal to or above ±4.

Figure 8:
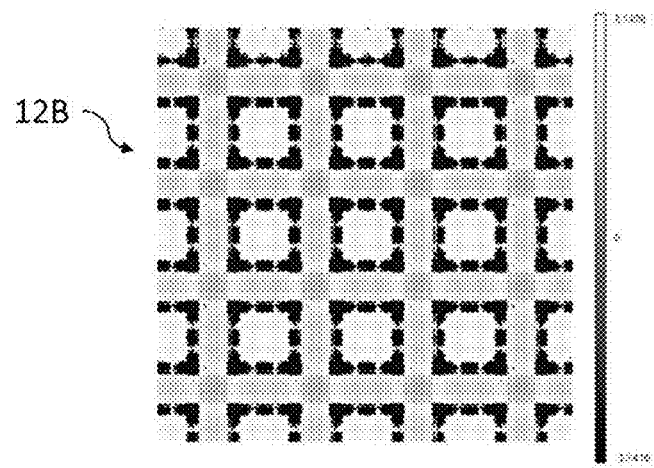
FIG. 8 schematically shows a phase modulation distribution diagram of another example of a phase-typed diffraction suppressing optical device according to an embodiment of the invention.

FIG. 8 shows a diffraction suppressing optical device 12B as an example of the diffraction suppressing optical device 12, which is designed for the display screen 11 shown in FIG. 4 under the condition of a distance d=1.5 mm according to an embodiment of the invention. Similar to that shown in FIG. 5, FIG. 8 shows a phase modulation distribution diagram of the diffraction suppressing optical device 12B, which essentially corresponds to the transmittance function $t_2(x_2,y_2)$ of the diffraction suppressing optical device 12B. The transmittance function $t_2(x_2,y_2)=\exp(i\varphi_{21}(x_2,y_2))$ of the diffraction suppressing optical device 12B shown in FIG. 8 is calculated according to the method 3 of the embodiment of the invention.

Figure 9:
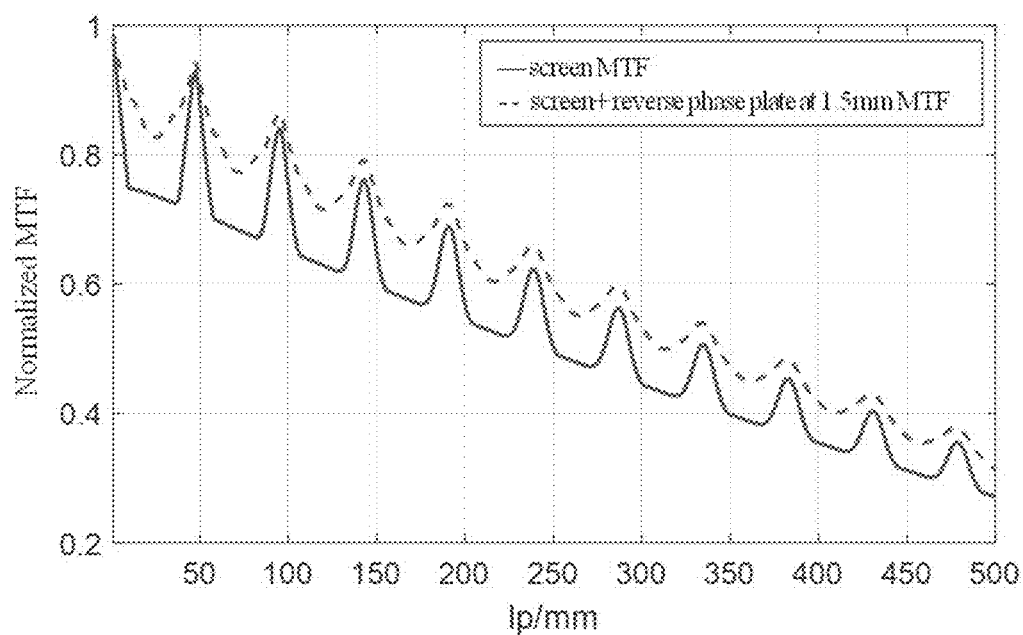
FIG. 9 shows a MTF curve obtained by combining the phase-typed diffraction suppressing optical device shown in FIG. 8 with the transparent display screen.

FIG. 9 shows a MTF curve obtained by combining the diffraction suppressing optical device 12B(referred to as "reverse phase plate" in the figure) shown in FIG. 8 with the transparent display screen 11 (referred to as "screen" in the figure) shown in FIG. 4. A MTF curve of the imaging system with only the display screen 11 is also given in FIG. 9. As shown in FIG. 9, the MTF of the system is improved by adding the diffraction suppressing optical device 12B at a distance d=1.5 mm.

Figure 10:
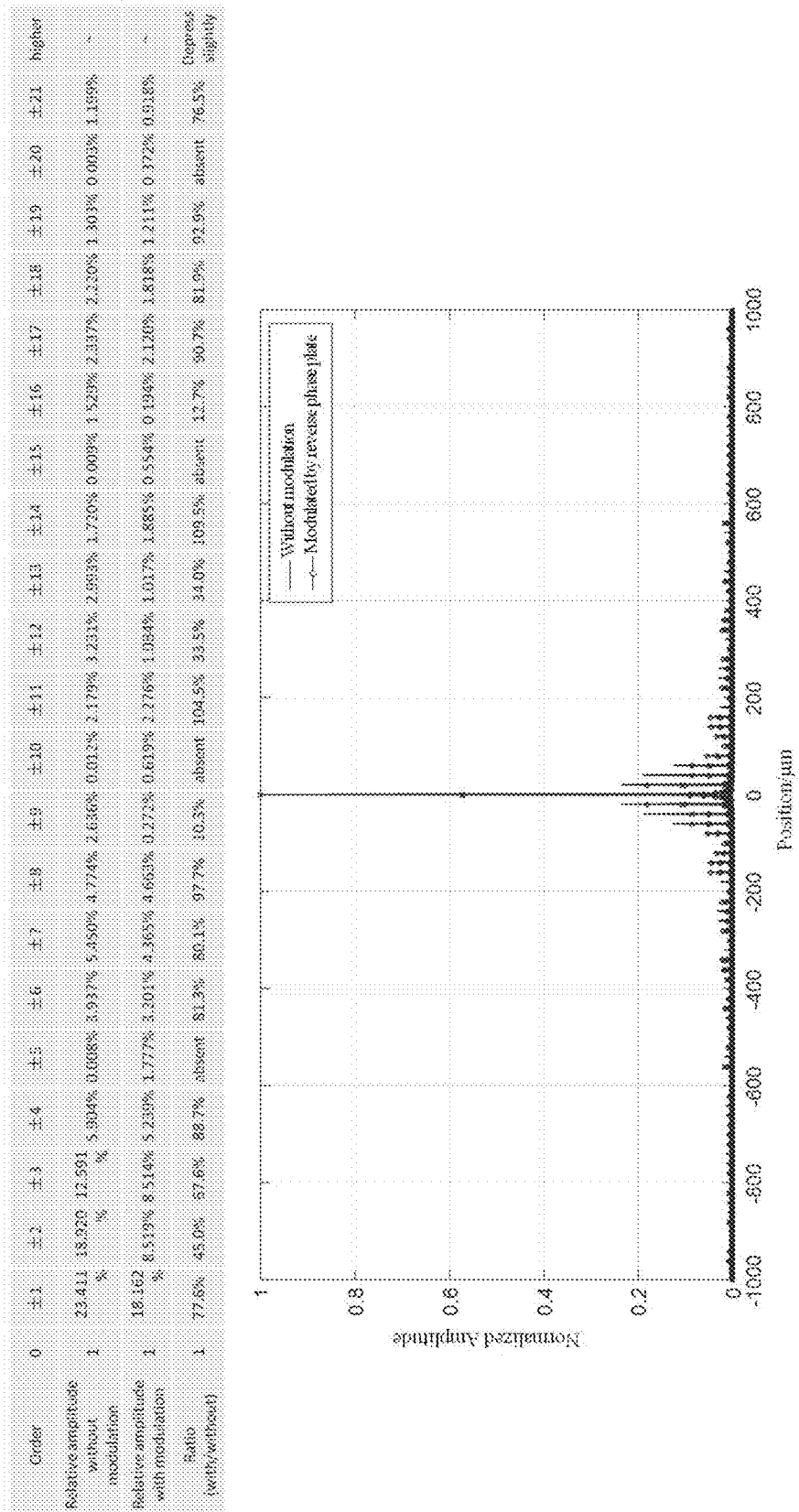
FIG. 10 shows a simulation data chart of the diffraction suppressing effect obtained by combining the phase-typed diffraction suppressing optical device shown in FIG. 8 with the transparent display screen.

FIG. 10 shows a simulation data chart of the diffraction suppression effect of the system obtained by combining the diffraction suppressing optical device 12B shown in FIG. 8 with the transparent display screen 11 shown in FIG. 4. As shown in FIG. 10, the arrangement of the diffraction suppressing optical device 12B has an obvious suppressing effect on the orders of ±1 to ±3 and has a small suppressing effect on most orders equal to or above ±4.

Comparing the diffraction suppressing optical device 12A and the diffraction suppressing optical device 12B, the diffraction suppressing effect and the MTF improvement effect of them are generally similar. Therefore, the distance d that is easy to assemble and the corresponding design of the diffraction suppressing optical device 12 can be selected during design.

Figure 11:
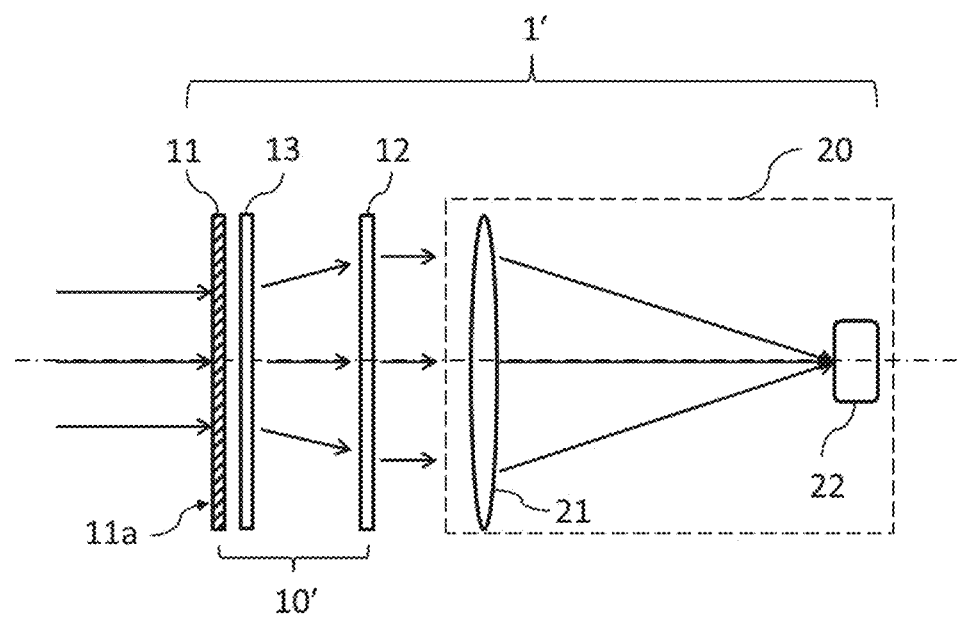
FIG. 11 is a schematic diagram of an under-screen camera apparatus according to a second embodiment of the invention.

FIG. 11 is a schematic diagram of an under-screen camera apparatus 1' according to the second embodiment of the invention. As shown in FIG. 11, the under-screen camera apparatus 1' further comprises another diffraction suppressing optical device 13. The transparent display screen 11, the diffraction suppressing optical device 12, and the diffraction suppressing optical device 13 constitute the diffraction suppressing display screen 10'. Hereinafter, the diffraction suppressing optical device 12 is referred to as a first diffraction suppressing optical device, and the diffraction suppressing optical device 13 is referred to as a second diffraction suppressing optical device for distinction. According to the embodiment of the invention, the second diffraction suppressing optical device 13 is an optical device that suppresses diffraction by amplitude-modulating incident light, having little effect on the phase of the incident light, and is hereinafter referred to as an amplitude-typed diffraction suppressing optical device. The second diffraction suppressing optical device 13 has a third transmittance function $t_3 (x_3, y_3) = A_3 (x_3, y_3)$ for changing light transmittance near the edge of the light-shielding strips.

In the example shown in FIG. 11, the second diffraction suppressing optical device 13 may be disposed between the display screen 11 and the first diffraction suppressing optical device 12. In other examples, the second diffraction suppressing optical device 13 may also be incorporated within the display screen 11.

Figure 12:
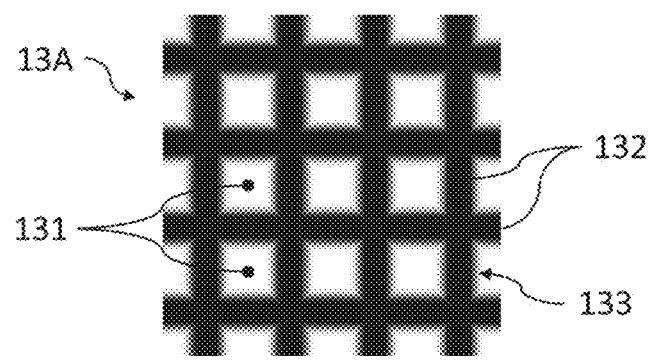
FIG. 12 is a schematic diagram of an example of an amplitude-typed diffraction suppressing optical device that can be used in the invention.

FIG. 12 shows a second diffraction suppressing optical device 13A as an example of an amplitude-typed diffraction suppressing optical device that can be used in the invention. As shown in the figure, the second diffraction suppressing optical device 13A comprises a sheet-shaped body, and the sheet-shaped body comprises: a first region 131 arranged periodically; a second region 132 substantively in a strip shape and arranged around the first region 131; and a transition region 133, which is located to an edge of the second region 132; wherein the transition region 133 extends from the edge of the second region 132 along an extension direction which is normal to the edge toward the first region 131. The first region 131 is a light-transmitting region, the second region 132 comprises a light-shielding area at least at the edge thereof, and the transmittance of the transition region 133 varies along its extension direction. The second diffraction suppressing optical device 13 is provided in the diffraction suppressing display screen 10 so that the light-shielding area at the edge of the second region 132 and the first region 131 of the second diffraction suppressing optical device are aligned in correspondence with an edge of the light-shielding strip 112 which is adjacent to a pixel unit 111 of the display screen and the corresponding pixel units 111, respectively.

The transmittance of the transition region 133 of the second diffraction suppressing optical device 13A has a change along its extension direction, which conforms to an apodization function, and the apodization function is selected from a group consisted of linear function, Blackman function, Connes function, and Gaussian function. In the example shown in FIG. 12, the second diffraction suppressing optical device 13A is designed so that the change of the transmittance of the transition region along its extension direction conforms to the Connes function $$f(x) = \left(1 - \frac{x^2}{a^2}\right)^2,$$

where "a" is a width of the transition region/grayscale region, and "x" is a coordinate value along a direction in which the grayscale changes.

Figures 13, 14:
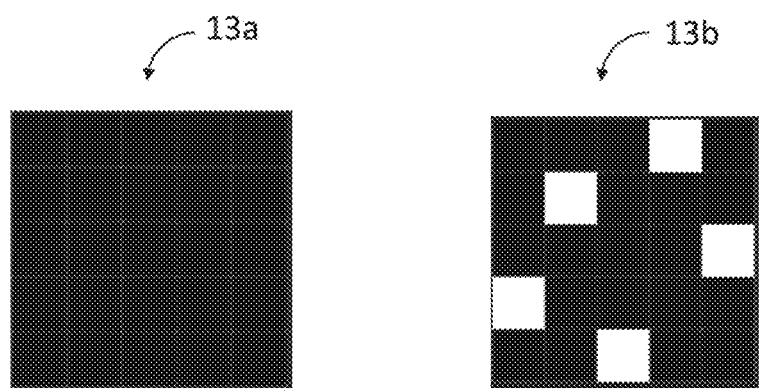
FIG. 13 shows a schematic diagram of an opaque grayscale unit in a transition region of the amplitude-typed diffraction suppressing optical device shown in FIG. 12.
FIG. 14 shows a schematic diagram showing that of a grayscale unit with certain transparency in a transition region of the amplitude-typed diffraction suppressing optical device shown in FIG. 12.

The transition region 133 of the second diffraction suppressing optical device 13A may comprise an opaque portion and a transparent portion, and the transmittance of the transition region 133 is determined by a ratio between the opaque portion and the transparent portion. As an example, FIGS. 13 and 14 show schematic diagrams of grayscale units with different transmittance in the transition region of the second diffraction suppressing optical device 13 in FIG. 12, respectively. FIG. 13 is a schematic diagram of a grayscale unit with a square shape and a transparency of 0, and FIG. 14 is a schematic diagram of a grayscale unit with a square shape and certain transparency. In order to realize the change in the transmittance of the transition region 133, for example, 5*5 minimum processing size can be taken as one grayscale unit. Since there is no transparent part in the grayscale unit 13a shown in FIG. 13, the transmittance of the grayscale unit 13a is 0%, and the corresponding grayscale value is 0; and in the grayscale unit 13b shown in FIG. 14, 5 of the 25 minimum processing sizes are randomly selected to be light-transmitting, the transmittance of the grayscale unit 13b is 20%, and the corresponding grayscale value is for example 51. By analogy, the gray level of each grayscale unit can be quantized to 0~255. By way of example only and not limitation, one minimum processing size may be 200*200 nm. The size of the grayscale units 13a and 13b in FIGS. 13 and 14 is 1*1 μm.

The grayscale gradient implementation described above is an example of a grayscale unit composed of 5*5 minimum processing sizes. Of course, other combinations of minimum processing sizes of different numbers are also possible, such as 4*4, 6*6, 10*10, etc. In other examples, the grayscale unit may also have a shape other than a square, such as a rectangle, a hexagon, and the like, and the invention is not limited in this respect.

Figure 15:
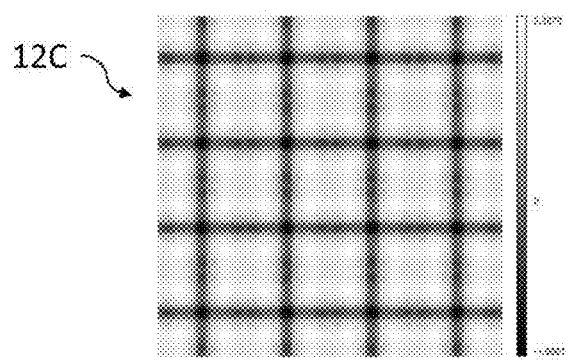
FIG. 15 schematically shows a phase modulation distribution diagram of another example of a phase-typed diffraction suppressing optical device according to an embodiment of the invention.

FIG. 15 shows a diffraction suppressing optical device 12C as an example of the diffraction suppressing optical device 12, which is designed for the display screen 11 shown in FIG. 4 under the condition of a distance d=1 mm according to an embodiment of the invention. Similar to that shown in FIGS. 5 and 8, FIG. 15 shows a phase modulation distribution diagram of the diffraction suppressing optical device 12C, which essentially corresponds to the transmittance function $t_2 (x_2, y_2)$ of the diffraction suppressing optical device 12C. The transmittance function $t_2 (x_2, y_2) = \exp(i\varphi_{21}(x_2, y_2))$ of the diffraction suppressing optical device 12C shown in FIG. 15 is calculated according to the method 3 of the embodiment of the invention. When further designing the diffraction suppressing optical device 12C, the influence of the phase when the incident light passing through the second diffraction suppressing optical device may also be taken into account.

Figure 16:
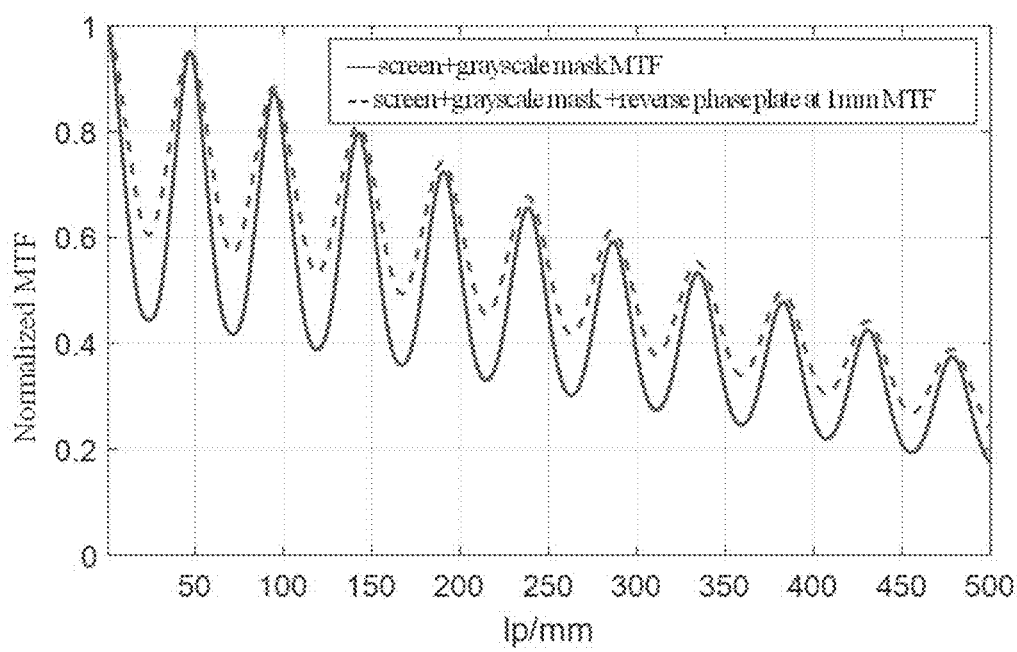
FIG. 16 shows a MTF curve obtained by combining the amplitude-typed diffraction suppressing optical device shown in FIG. 12, the phase-typed diffraction suppressing optical device shown in FIG. 15, and the transparent display screen.

FIG. 16 shows a MTF curve obtained by combining the diffraction suppressing optical device 12C (referred to as "reverse phase plate" in the figure) shown in FIG. 15, the transparent display screen 11(referred to as "screen" in the figure) shown in FIG. 4, and the second diffraction suppressing optical device 13A (referred to as "grayscale mask" in the figure) shown in FIG. 12 (with the second diffraction suppressing optical device 13A abutting on the display screen 11). A MTF curve when only the display screen 11 and the second diffraction suppressing optical device 13A are combined is also shown for comparison. As shown in FIG. 16, by adding the diffraction suppressing optical device 12C at the distance d=1 mm, the MTF of the system is also improved compared to the case where the second diffraction suppressing optical device 13A is incorporated.

Figure 17:
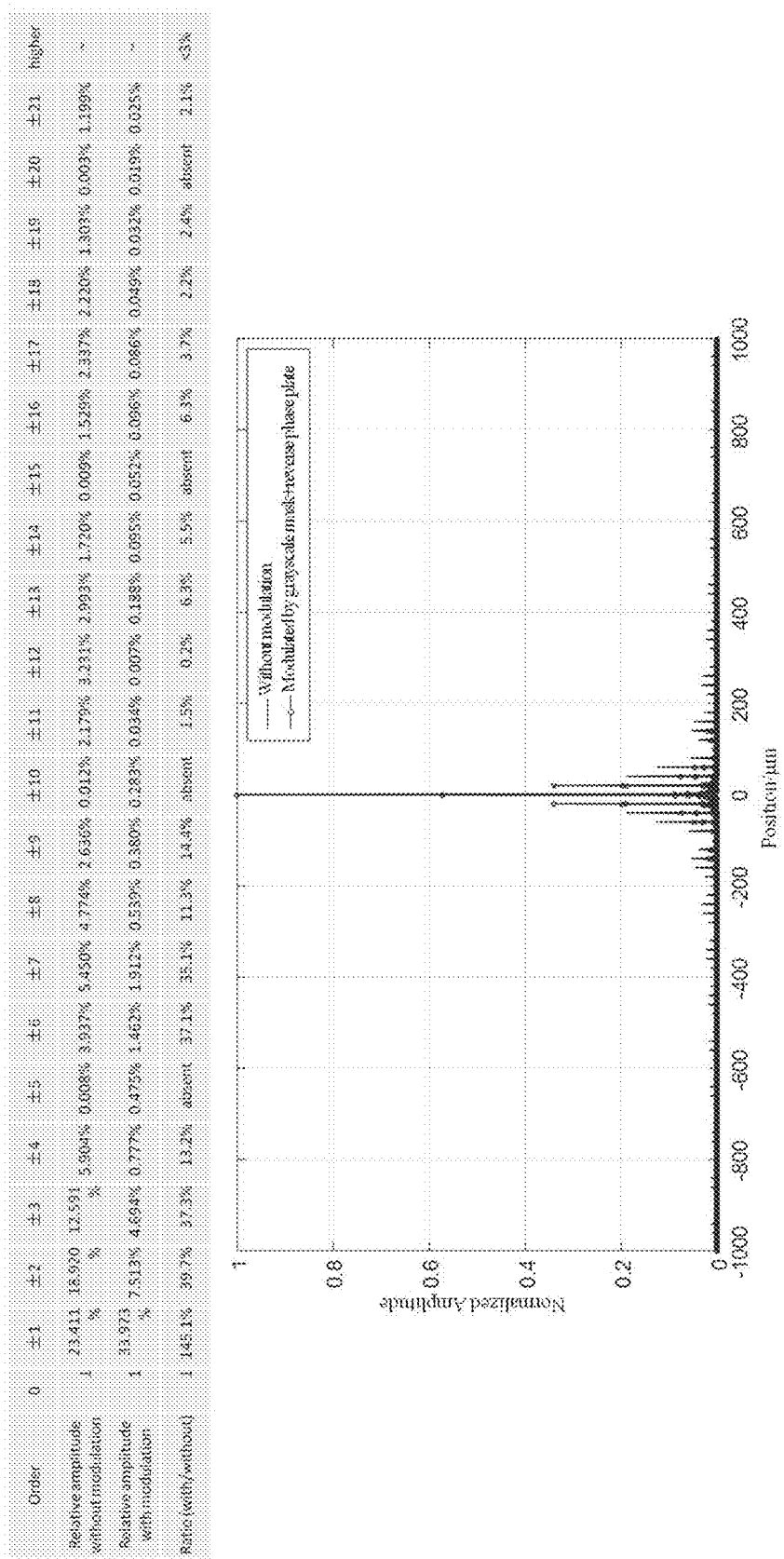
FIG. 17 shows a simulation data chart of diffraction suppressing effect obtained by combining the amplitude-typed diffraction suppressing optical device shown in FIG. 12, the phase-typed diffraction suppressing optical device shown in FIG. 15, and the transparent display screen.

FIG. 17 shows a simulation data chart of the diffraction suppression effect of the system obtained by combining the diffraction suppressing optical device 12C shown in FIG. 15, the transparent display screen 11 shown in FIG. 4, and the second diffraction suppressing optical device 13A shown in FIG. 12. As shown in FIG. 17, the arrangement of the diffraction suppressing optical device 12C has an obvious suppressing effect on diffraction on the order of ±2 or above. When the order is above ±11, diffraction can be suppressed to less than 7% of the original; when the order is above ±18, diffraction can be suppressed to less than 3% of the original.

Figure 18:
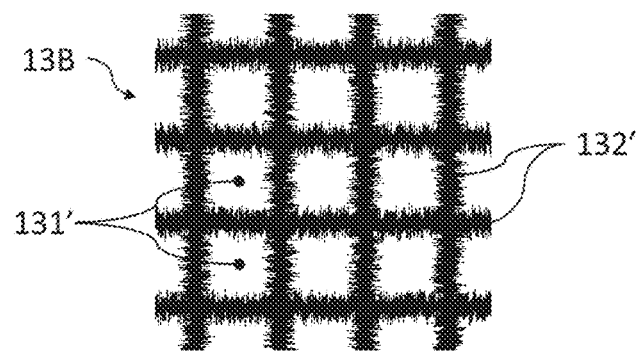
FIG. 18 is a schematic diagram of another example of an amplitude-typed diffraction suppressing optical device that can be used in the invention.

FIG. 18 shows a second diffraction suppressing optical device 13B as another example of an amplitude-typed diffraction suppressing optical device that can be used in the under-screen camera apparatus 1' shown in FIG. 11. As shown in FIG. 18, the second diffraction suppressing optical device 13B is formed as a sheet-shaped component, and the sheet-shaped component comprises: a first region 131' arranged periodically in two dimensions; a second region 132' substantively in a strip shape and arranged around the first region 131'. The first region 131' is a light-transmitting region. The second region 132' has a shape generated by randomly dislocating a plurality of unit patterns arranged along an extending direction of the strip shape in a lateral direction perpendicular to the extending direction, and the second region 132' is light-shielding at least in its two lateral edge portions. In the example shown in FIG. 18, the unit pattern is a rectangle or a line segment, and the second region 132' is generally in a shape of random burrs at its edges.

It should be understood that the amplitude-typed diffraction suppressing optical device (second diffraction suppressing optical device) used in the invention is not limited to the specific forms described with reference to FIGS. 12 and 18, but may have any other suitable means capable of amplitude modulating the light and thereby suppressing diffraction caused by periodic structures in the display screen.

Figure 19:
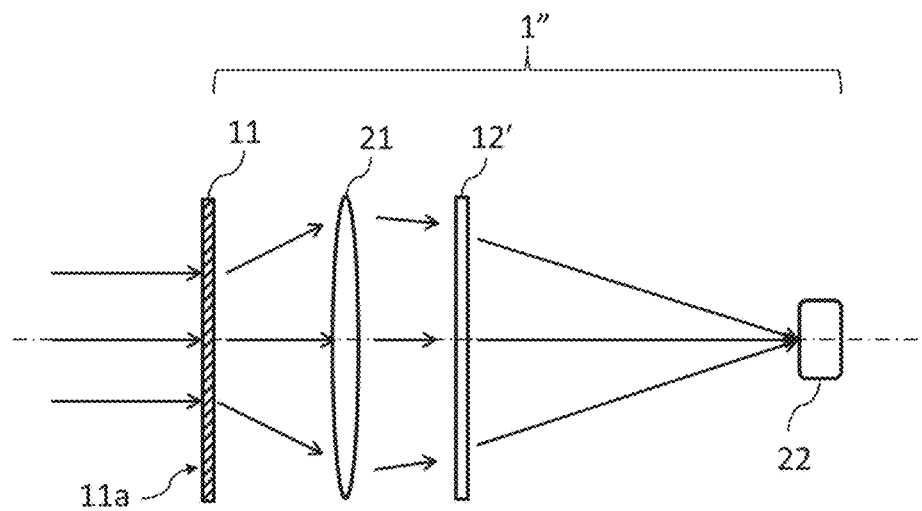
FIG. 19 is a schematic diagram of an under-screen camera apparatus according to a third embodiment of the invention.
Figure 20:
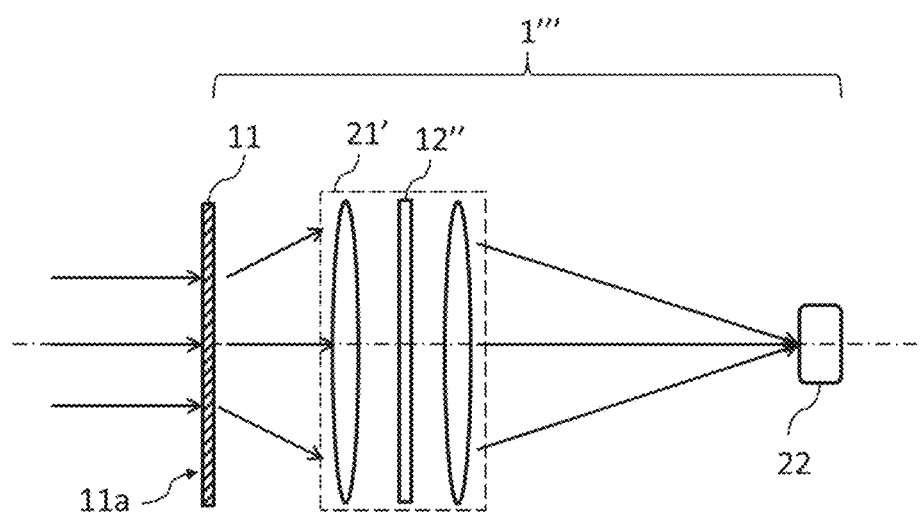
FIG. 20 is a schematic diagram of an under-screen camera apparatus according to a fourth embodiment of the invention.

In the embodiments of the invention described above, it is preferable that the phase-typed diffraction suppressing optical device in the under-screen camera apparatus is disposed between the display screen and the imaging lens. However, according to the inventive concept of the invention, such a configuration is not necessary. For example, in the under-screen camera apparatuses according to the third and fourth embodiments of the invention as shown in FIGS. 19 and 20, the phase-typed diffraction suppressing optical device 12' may be disposed between the imaging lens 21 and the image sensor 22 (see the under-screen camera apparatus 1" shown in FIG. 19) or may be disposed between a plurality of mirrors in the imaging lens 21' (see the under-screen camera apparatus 1'" shown in FIG. 20).

The above description is merely an illustration of the preferred embodiments of the present application and the applied technical principles. Those skilled in the art should understand that the scope of the invention involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A diffraction suppressing display screen, comprising:
    a display screen that allows light to pass therethrough and comprises periodically arranged pixel units; and
    a first diffraction suppressing optical device disposed at a distance d from the display screen,
    wherein the display screen has a first transmittance function $t1(x1,y1)$, so that a light field complex amplitude distribution $U(x2,y2,d)=A(x2,y2,d)\exp(i\varphi 20(x2,y2,d))$ is obtained when a plane wave $U0=A0\exp(i\varphi 0)$ is incident on the display screen and transmitted and then propagates by the distance d, and the first diffraction suppressing optical device has a second transmittance function $t2(x2,y2)=\exp(i\varphi 21(x2,y2))$, and satisfies $\varphi 20(x2,y2,d)+\varphi 21(x2,y2)=C$, where C is a constant;
    the display screen further comprises light-shielding strips periodically arranged around the pixel units, and the diffraction suppressing display screen further comprises a second diffraction suppressing optical device which is configured to have a third transmittance function $t3(x3,y3)=A3(x3,y3)$, so as to change light transmittance at a position near the edge of the light-shielding strips; and
    the second diffraction suppressing optical device is formed as a sheet-shaped component comprising a first region arranged periodically in two dimensions and a second region having a strip shape and arranged around the first region, the first region being a light-transmitting region, wherein the second region has a shape generated by randomly dislocating a plurality of unit patterns arranged along an extending direction of the strip shape in a lateral direction perpendicular to the extending direction, and the second region is light-shielding at least in its two lateral edge portions.

2. The diffraction suppressing display screen of claim 1, wherein the distanced is in the range of 0.1-5 mm.

3. The diffraction suppressing display screen of claim 2, wherein the second diffraction suppressing optical device is incorporated within the display screen or disposed between the display screen and the first diffraction suppressing optical device.

4. The diffraction suppressing display screen of claim 1, wherein the second diffraction suppressing optical device is incorporated within the display screen or disposed between the display screen and the first diffraction suppressing optical device.

5. The diffraction suppressing display screen of claim 1, wherein the distance d is in the range of 0.3-2 mm.

6. The diffraction suppressing display screen of claim 5, wherein the second diffraction suppressing optical device is incorporated within the display screen or disposed between the display screen and the first diffraction suppressing optical device.

7. An under-screen camera apparatus, comprising:
a diffraction suppressing display screen having a display surface for displaying and a rear surface opposite the display surface; and
a camera, which is arranged on a side of the diffraction suppressing display screen where the rear surface is positioned, and is used for imaging an object located on a side of the diffraction display screen where the display surface is positioned, wherein
the diffraction suppressing display screen comprises:
a display screen that allows light to pass therethrough and comprises periodically arranged pixel units; and
a first diffraction suppressing optical device disposed at a distance d from the display screen,
wherein the display screen has a first transmittance function t1(x1,y1), so that a light field complex amplitude distribution U(x2,y2,d)=A(x2,y2,d)exp(iφ20(x2,y2,d)) is obtained when a plane wave U0=A0exp(iφ0) is incident on the display screen and transmitted and then propagates by the distance d, and the first diffraction suppressing optical device has a second transmittance function t2 (x2,y2)=exp(iφ21(x2,y2)), and satisfies φ20 (x2,y2,d)+φ21 (x2,y2)=C, where C is a constant;

the display screen further comprises light-shielding strips periodically arranged around the pixel units, and the diffraction suppressing display screen further comprises a second diffraction suppressing optical device which is configured to have a third transmittance function t3 (x3,y3)=A3 (x3,y3), so as to change light transmittance at a position near the edge of the light-shielding strips; and the second diffraction suppressing optical device is formed as a sheet-shaped component comprising a first region arranged periodically in two dimensions and a second region having a strip shape and arranged around the first region, the first region being a light-transmitting region, wherein the second region has a shape generated by randomly dislocating a plurality of unit patterns arranged along an extending direction of the strip shape in a lateral direction perpendicular to the extending direction, and the second region is light-shielding at least in its two lateral edge portions.

8. The under-screen camera apparatus of claim 7, wherein the distance d is in the range of 0.1-5 mm.

9. The diffraction suppressing display screen of claim 7, wherein the second diffraction suppressing optical device is incorporated within the display screen or disposed between the display screen and the first diffraction suppressing optical device.

* * * * *